Dec. 30, 1969     K. F. NILSSON     3,486,310
BAG FILTER SYSTEM
Filed June 3, 1968
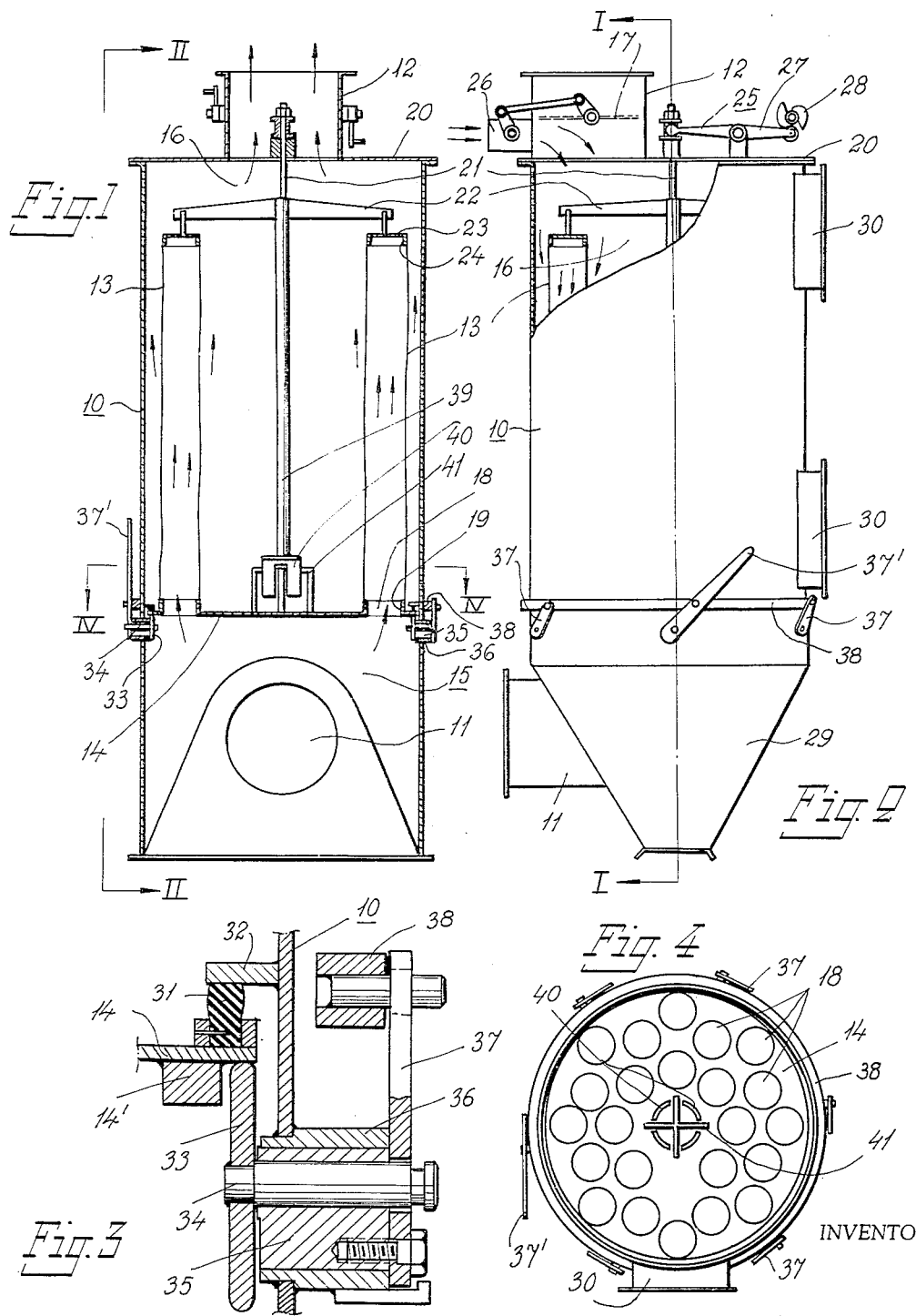
INVENTOR
KARL FOLKE NILSSON
BY
Stevens, Davis, Miller & Mosher    ATTORNEYS United States Patent Office 3,486,310
Patented Dec. 30, 1969

3,486,310
BAG FILTER SYSTEM
Karl Folke Nilsson, Skelleftehamn, Sweden, assignor to Boliden Aktiebolag, Stockholm, Sweden
Filed June 3, 1968, Ser. No. 733,903
Claims priority, application Sweden, June 22, 1967, 9,017/67
Int. Cl. B01d 33/00
U.S. Cl. 55—304
3 Claims

ABSTRACT OF THE DISCLOSURE

A bag filter system which includes a multiple of bag or hose-like filters mounted in an upright housing and in which the walls of the filter bags segregate a space intended for impure gas and a space for filtered gas. The system is provided with a stand which supports the filter elements and which can be rotated in relation to the filter housing so that each filter can be made to appear in the vicinity of an opening in the housing, to enable the filter element attachment means to be reached from outside the filter housing.

---

The present invention is concerned with an arrangement in filter systems of the type which include a multiple of bag or hose-like filter elements accommodated in a filter housing, and wherein the walls of said elements partition a space provided with an intake for the gas to be filtered and a space provided with an outlet for the filter gas, and in which the filter housing presents at least one sealable opening which permits access to the attachment means by which the filter elements are secured in the system.

The replacement of filter elements in conventional filter systems of the above type is often accompanied with disadvantages. Thus, it is necessary for the workman to enter the filter housing in order to reach those filter element attachments which are not located in the close vicinity of an opening in the filter housing. This task can be associated with a great deal of discomfort, and may even prove dangerous if the dust is poisonous or in any other way deleterious to the health.

The invention is primarily intended to circumvent the aforementioned disadvantages and, in accordance with the invention, the filter elements in a filter system of the type mentioned in the introduction are carried by a stand which is mounted for rotation in relation to the filter housing and which permits each of the filter element attachments to be so placed adjacent said opening or openings that said attachments can be reached from outside the filter housing.

The invention will now be described in more detail with reference to an embodiment of the same shown diagrammatically in the accompanying drawing; further features characteristic of the invention being disclosed in conjunction therewith.

FIGURE 1 is a view of a filter system according to the invention, taken through the line I—I in FIGURE 2.

FIGURE 2 is a vertical projection view of the system, seen in the direction of the arrow II—II in FIGURE 1, a portion of the filter housing being cut away so that the construction of the system can be seen more clearly.

FIGURE 3 is a sectional view in enlarged scale of the arrangement shown in FIGURES 1 and 2, for inserting and removing an attachment plate intended for the bottom of the filter element into and out of sealing engagement with the filter housing.

FIGURE 4 is a sectional view taken through the line IV—IV in FIGURE 1 and shows a somewhat modified attachment plate.

In the drawing a filter housing is generally indicated at 10. The filter housing 10 is provided with an intake 11 for gas, for instance dust-laden air, which is to be filtered, and an outlet 12 for filtered gas. A multiple of bag or hose-like filter elements 13 are disposed within the filter housing, the walls of which elements together with a lower attachment plate 14 partition off two spaces 15 and 16 in the filter housing. As is indicated with arrows in FIGURE 1, the impure gas flows into the space 15 through the intake 11 and is filtered upon its passage through the walls of the filter elements 13 to the space 16. The filtered gas flows out of the space 16 through the outlet 12, which may be connected to a fan (not shown), which, possibly together with other auxiliary means such as the throttle means indicated at 17 in FIGURE 2, controls the flow of gases through the filter system.

The bottom portions of the filter elements 13 are secured to the attachment plate 14, which presents a number of holes 18 provided with upstanding collars 19, around which the lower ends of the filter elements are fastened. The filter elements extend substantially vertically in the filter housing, which is in the form of an upright container, and are supported at their upper ends by an attachment means which in turn is supported by a vertical shaft 21 held in the upper portion 20 of the filter housing. The attachment means includes a number of arms 22 in which attachment members are mounted. Each attachment member includes a disc shaped member 23, which prevents the impure gas from passing unfiltered axially through the filter elements; and a collar 24 which projects downwardly from the periphery of the member 23 and around which the upper portion of the filter element is fastened.

The dust separated during the filtering process settles on the inside walls of the filter elements 13 and a conventional vibration or knocking mechanism 25 is arranged to free the filter elements from the dust adhered thereto, wherein said mechanism when necessary or at predetermined regular intervals is caused to stretch and slacken the filter elements by lifting and lowering the shaft 21, which is displaceably supported in the upper portion 20 for this purpose. Immediately prior to vibrating the filter elements in this manner the throttle 17 is caused to close the outlet 12, and a valve in a conduit 26 is opened to cause the interior of the filter housing to communicate with the surrounding atmosphere, as indicated with arrows in FIGURE 2, to equalize the pressure in the spaces 15 and 16. The shaft 21 is raised and lowered by means of a double-armed lever 27, the one end of which is adapted to actuate the shaft 21 in axial directions and the other end of which is actuated by a cam means 28. When the dust is shaken loose from the filter elements it falls from the interior of the filter elements down into a trough-shaped bottom portion 29 of the filter-housing, where it is collected in a known manner in a container (not shown). The aforedescribed vibrating mechanism does not constitute a part of the present invention, and it should be understood that many other known arrangements can be used for cleaning the filter elements. For the sake of clarity FIGURES 1 and 2 only show two filter elements 13. Normally, however, many more filter elements are used, and for this reason FIGURE 4 shows an attachment plate 14 adapted to accommodate twenty four filter elements.

To render it unnecessary for the workman to enter the filter housing 10 when changing the filter elements, the filter elements 13 are supported according to the invention by a stand mounted for rotation relative to the filter housing and permitting the attachments of the filter elements to be so positioned adjacent the openings 30 that said attachments can be reached from outside the filter housing. In the shown embodiment the stand includes the shaft 21, the upper attachment means 22, 23, 24 and the attachment plate 14. The shaft 21 is mounted for rotation in the upper portion 20 of the filter housing, as can best be seen from FIGURE 1, and the attachment plate 14, which is normally in sealing engagement with the filter housing so that the impure gas is caused to pass in its entirety through the walls of the filter elements 13, is adapted to be moved out of engagement with the filter housing so that it can be rotated relative to the same.

To provide for said sealing between the attachment plate 14 and the filter housing 10 the said attachment plate, as shown in FIGURE 1 and in enlarged scale in FIGURE 3, supports on its upper face, around its periphery, a sealing member 31, which is adapted to be urged against a shoulder 32 on the inner wall of the filter housing when the attachment plate 14 is pressed upwards. The attachment plate 14 is supported at its bottom face, around its periphery, by a number of support wheels 33, which are each mounted for rotation on their respective shafts 34, which are supported by the filter house wall. To localize the attachment plate 14 in relation to the support wheels 33 the attachment plate is arranged to carry an annular guide strip 14' (FIGURE 3) positioned radially inside the point where the support wheels engage the said attachment plate.

In the shown embodiment the support wheels 33 support the attachment plate 14 in the position in which the sealing member 31 abuts the shoulder 32, preventing rotation of the attachment plate 14, and the position in which the sealing member 31 is out of engagement with the shoulder 32 and the attachment plate 14 can be rotated relative to the filter housing 10. The support wheels 33 and the shaft 34 are, for this reason, each supported indirectly by the filter house wall, through the intermediary of eccentric arrangements supported by the filter house wall; the said eccentric arrangement comprising a cylindrical eccentric member 35, the shaft 34 of which is mounted eccentrically and which in turn is mounted in a sleeve 36 secured to the wall of the filter housing. An arm 37, which can be actuated from outside the filter housing, is connected with the eccentric member 35 and serves to rotate the same, whereby the shaft 34, and thus also the wheel 33, can be moved to a limited extent towards and away from the shoulder 32, to move the sealing member 31 into and out of engagement therewith. To enable collective switching of all eccentric means 35, the arms 37 are pivotally connected with a ring 38 which extends around the filter housing, and one, 37', of the arms 37 is extended, and adapted to be actuated for rotating all arms 37 simultaneously.

The upper attachment means 21–24 is connected with the attachment plate 14 by movement transmitting means. The said movement transmitting means includes a shaft 39, which extends vertically downwards as an extension of the shaft 21, and which is non-rotatably supported by the same. The shaft 39 supports at its lower end a coupling portion 40, which engages in a complementary coupling portion 41 located on the upper surface of the attachment plate 14, the coupling 40, 41 being adapted to transmit rotary motion between the shaft 39 and the attachment plate 14, and to permit axial movement of the coupling portions relative to each other.

Subsequent to lowering the attachment plate 14 so that the sealing member 31 comes out of engagement with the shoulder 32 it is possible in the aforedescribed arrangement according to the invention to rotate the stand supporting the filter elements relative to the filter house wall until the desired filter element is situated opposite the openings 30, where said filter can easily be reached from outside the filter housing. If the filter element is to be exchanged it is expedient to lock the stand in this position, by returning the sealing member 31 into engagement with the shoulder 32.

What is claimed is:

1. A bag filter apparatus comprising an upright casing, an upper and a lower filter bag attachment means, a shaft substantially vertically and rotatably mounted in said casing and having said upper and lower filter bag attachment means coaxially mounted thereon in spaced relationship, a plurality of filter bag elements disposed to hang vertically within said casing between said upper and lower filter bag attachment means, means to impart axial reciprocatory movement to the filter bags, means for moving the lower attachment means between a first position in which it is in non-rotational, sealing engagement with said casing and a second position in which it is out of engagement with said casing to permit rotation of the bags about a vertical axis.

2. The bag filter apparatus according to claim 1, further comprising an abutment surface formed on the inner wall of said casing adjacent the lower end thereof, a sealing ring arranged around the perimeter of the lower filter bag attachment means to cooperate with said abutment surface, a plurality of runners mounted on eccentrically mounted shafts arranged beneath said lower attachment means to cooperate therewith, whereby rotation of said eccentrically mounted shafts causes the lower attachment means to be moved upwardly urging said sealing ring tightly against said abutment surface.

3. A bag filter apparatus, according to claim 2, further comprising master actuator means operatively connected to rotate said eccentrically mounted shafts in concert.

References Cited

UNITED STATES PATENTS

| | | | |
|---|---|---|---|
| 832,450 | 10/1906 | Beth | 55—304 |
| 1,843,639 | 2/1932 | Hansen | 55—341 |
| 1,912,280 | 5/1933 | Kleissler | 55—304 |
| 2,137,254 | 11/1938 | Turnbull | 55—341 |
| 2,167,236 | 7/1939 | Gieseler | 55—341 |
| 2,853,153 | 9/1958 | Sexton | 55—481 |
| 2,854,091 | 9/1958 | Roberts et al. | 55—341 |
| 3,339,347 | 9/1967 | Otto | 55—302 |
| 3,345,806 | 10/1967 | Bullock et al. | 55—341 |

HARRY B. THORNTON, Primary Examiner

B. NOZICK, Assistant Examiner

U.S. Cl. X.R.

55—341, 378, 502